(12) United States Patent
Mouleyre et al.

(10) Patent No.: US 11,345,318 B2
(45) Date of Patent: May 31, 2022

(54) ADAPTER FOR CONNECTING A WINDSCREEN WIPER BLADE TO A DRIVING ARM

(71) Applicant: Valeo Systèmes d'Essuyage, Le Mesnil Saint Denis (FR)

(72) Inventors: Guillaume Mouleyre, Saint Genès Champanelle (FR); William Terrasse, Vic-le-Comte (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/195,082

(22) Filed: Jun. 28, 2016

(65) Prior Publication Data

US 2016/0375872 A1 Dec. 29, 2016

(30) Foreign Application Priority Data

Jun. 29, 2015 (FR) ...................... 1556026

(51) Int. Cl.
*B60S 1/40* (2006.01)
*B60S 1/38* (2006.01)

(52) U.S. Cl.
CPC ........... *B60S 1/4038* (2013.01); *B60S 1/3806* (2013.01); *B60S 1/387* (2013.01); *B60S 1/3853* (2013.01); *B60S 1/3874* (2013.01); *B60S 1/3887* (2013.01); *B60S 1/4003* (2013.01); *B60S 1/4048* (2013.01); *B60S 2001/4051* (2013.01); *B60S 2001/4054* (2013.01)

(58) Field of Classification Search
CPC .... B60S 1/4038; B60S 1/3806; B60S 1/3853; B60S 1/387; B60S 1/3874; B60S 1/3887; B60S 1/4003; B60S 1/4048; B60S 1/40

USPC ............ 15/250.32, 250.201, 250.23, 250.43, 15/250.44

See application file for complete search history.

(56) References Cited

U.S. PATENT DOCUMENTS

| 9,751,501 B2 * | 9/2017 | Houssat | ................ B60S 1/4045 |
| 2009/0199357 A1 * | 8/2009 | Thienard | ............... B60S 1/3853 |
| | | | 15/250.32 |

(Continued)

FOREIGN PATENT DOCUMENTS

| CN | 101437710 A | 5/2009 |
| CN | 104228770 A | 12/2014 |

(Continued)

OTHER PUBLICATIONS

Preliminary Report and Written Opinion Issued in Corresponding French Application No. 1556026, dated Apr. 27, 2016 (7 Pages).

(Continued)

*Primary Examiner* — Katina N. Henson
(74) *Attorney, Agent, or Firm* — Osha Bergman Watanabe & Burton LLP (57) ABSTRACT

Adapter (26, 26') for connecting a windscreen wiper blade (12) to a driving arm (14), the adapter (26, 26') having a 'U'-section formed by a base and two flanks (42a, 42b) delimiting a housing (45) in which:
at least one (42a) of the flanks is formed by at least two walls (42aa, 42bb) separated from one another by at least one cavity (63, 64), and
at least one protuberance (60) is connected to at least one of the walls (42aa, 42ab, 42ba, 42bb) and extends at least in part inside said housing (45).

18 Claims, 7 Drawing Sheets

(56) References Cited

U.S. PATENT DOCUMENTS

| | | | | |
|---|---|---|---|---|
| 2010/0154158 A1* | 6/2010 | Boland | ............... | B60S 1/3848 |
| | | | | 15/250.32 |
| 2013/0167317 A1* | 7/2013 | Oslizlo | ............... | B60S 1/4067 |
| | | | | 15/250.32 |
| 2015/0013093 A1 | 1/2015 | Polocoser et al. | | |
| 2015/0082578 A1* | 3/2015 | Erdal | ................... | B60S 1/4019 |
| | | | | 15/250.201 |

FOREIGN PATENT DOCUMENTS

| | | | | |
|---|---|---|---|---|
| EP | 1968828 A1 | 9/2008 | | |
| EP | 2733027 A1 | 5/2014 | | |
| EP | 2813404 A2 | 12/2014 | | |
| ES | 1071543 U | 3/2010 | | |
| GB | 2044082 A | 10/1980 | | |
| WO | WO-2012097490 A1 * | 7/2012 | ............ | B60S 1/4003 |
| WO | WO-2013037572 A1 * | 3/2013 | ............ | B60S 1/4064 |

OTHER PUBLICATIONS

The First Office Action issued in corresponding Chinese Patent Application No. 201610806526.8, dated Mar. 26, 2018 (12 pages).
Third Office Action issued in corresponding Chinese Application No. 201610806526.8, dated Jul. 29, 2019 (11 pages).

* cited by examiner

ADAPTER FOR CONNECTING A WINDSCREEN WIPER BLADE TO A DRIVING ARM

TECHNICAL FIELD

The present invention relates in particular to an adapter for connecting a windscreen wiper blade to a driving arm, in particular of a motor vehicle.

PRIOR ART

A motor vehicle is conventionally equipped with windscreen wipers for washing the windscreen and avoiding disruption to the drivers view of his surroundings. These windscreen wipers generally comprise a driving arm that carries out an angular to-and-fro movement and have elongate blades which themselves carry squeegee blades made of a resilient material. These squeegee blades rub against the windscreen and evacuate the water by removing it from the driver's field of view. The blades are produced in the form either, in a conventional version, of articulated brackets which hold the squeegee blade at a number of discrete locations, giving it a bend that allows it to follow whatever curvature the windscreen may have, or, in a more recent version, known as the "flat blade" version, of a semi-rigid assembly which holds the squeegee blade along its entire length by virtue of one or more bend-forming vertebrae making it possible to press the blade against the windscreen without having to use brackets.

In both solutions, the blade is attached to the driving arm by a connection system having a connector and an adapter. The connector is a piece which is secured to the blade and which is generally fastened directly to the squeegee blade or to the flat blade, whereas the adapter is secured to the arm. The adapter is an intermediate piece which allows the connector to be connected and fastened to the driving arm. It is generally configured in order to be inserted into a head or terminal piece, in the form of a yoke and having a U-shaped cross section, of the driving arm.

The connector and the adapter each comprise articulation means configured in order to interact with complementary means of the other member so as to define at least one transverse pivoting axis of the connector vis-à-vis the adapter, which is a pivoting axis of the blade vis-à-vis the arm. In the current art, one of the members, such as the connector, generally comprises a substantially cylindrical physical axis which defines the articulation axis and is received in a housing of complementary shape in the other member.

The adapter generally has a body configured in order to be inserted into the terminal piece of the arm such that this body extends at least in part between two substantially parallel lateral legs of the terminal piece. The body of the adapter is connected at one end to a fairing or cowling, currently called a head or cap, on which the free end of the terminal piece abuts. Lastly, the body of the adapter generally comprises an actuation button engaged by elastic snap-fitting in a hole or a notch in the terminal piece, when this latter abuts on the head, in order to lock the adapter vis-à-vis the terminal piece in this position.

An adapter makes it possible to join a blade to a particular type of terminal piece or arm. In the case of the above-mentioned terminal pieces with a U-shaped cross section for example, several varieties thereof exist. These varieties are very similar in appearance, but differ from one another in terms of dimensions and, in particular, in terms of their widths or lateral dimensions, the width of a terminal piece being defined by the distance between the lateral legs of the terminal piece and, more precisely, by the distance between the external faces of these lateral legs. They also vary in terms of the positions of the holes or notches designed to interact with the push buttons of the adapter.

In the current state of the art, there are as many varieties of adapter as there are varieties of terminal pieces or of ends of driving arms, which is neither practical nor economical. There is thus a genuine need for a universal adapter that can be mounted on at least two, and even more, terminal pieces of windscreen wiper arms.

The invention proposes an improvement to the prior art.

SUMMARY OF THE INVENTION

To that end the invention proposes an adapter for connecting a windscreen wiper blade to a driving arm, the adapter having a 'U'-section formed by a base and two flanks delimiting a housing in which adapter:
   at least one of the flanks is formed by at least two was separated from one another by at least one cavity, and
   at least one protuberance is connected to at least one of the was and extends at least in part inside said housing.

The adapter according to the invention may be used as a universal adapter, as will be described in detail below, i.e. an adapter for at least two different driving arms such as, for example, at least one arm with a U-shaped terminal piece or end, at least one rod arm (generally without a terminal piece), at least one arm with lateral locking (a side-lock arm), etc.

A flank with double walls, otherwise known as double skins, makes it possible to limit the amount of material required during manufacture of the piece, for example at the time of injection-moulding. It further makes it possible to improve the finished piece by reducing shrink cavities.

The adapter according to the invention may comprise one or more of the following features, taken individually or in combination with one another:
   the protuberance is connected to the two walls delimiting the cavity. The same applies in the case of the two protuberances,
   at least one of the protuberances is configured in order to interact with a complementary means of a connector for fastening the adapter to the connector and to define at least one means of pivoting about an axis between the adapter and the connector. The means of pivoting may comprise the two protuberances,
   at least one of the protuberances, and advantageously both protuberances, comprises at least one through-hole,
   the two flanks are each formed by at least two walls separated from one another by at least one cavity, and advantageously by four cavities,
   at least one of the flanks comprises a plurality of cavities separated from one another by at least one rib,
   the adapter may comprise a front part delimited from a rear part by an axis of pivoting passing via the protuberance, where the front part of the adapter comprises more cavities than does the rear part,
   at least one of the protuberances extends in a cavity provided between the was of the flank from which the protuberance extends. The two protuberances may be formed thus,
   the cavity or cavities opens (open) out on either side of the adapter, that is to say on the upper wall and on the lower wail of the adapter. Alternatively, the adapter may comprise at least one cavity that opens out and at least one blind cavity that are formed, for example, in one and the same lateral flank, the adapter comprises at least two protuberances each originating from a flank and extending substantially towards one another in the housing and located, preferably, opposite one another. These protuberances thus form a rotation bearing between the adapter and the connector, the two protuberances define one and the same axis of pivoting of the adapter on a connector, said at least one protuberance comprises a first part projecting from one of the walls, called the internal wall, in the housing and a second part extending between the was of the flank, said first and second parts have identical shapes in cross section and, advantageously, an identical external and/or internal diameter, at least one protuberance is configured in order to be engaged by elastic snap-fitting in a complementary means of a connector, at least one protuberance comprises a truncated or chamfered part for facilitating its engagement by elastic snap-fitting in said complementary means of said connector, said at least two protuberances have at least one plane of symmetry, and preferably two substantially perpendicular planes of symmetry, said at least one protuberance has a cylindrical and tubular overall form, said truncated or chamfered part defines a sliding ramp configured in order to interact with a part of the connector upon said engagement, said ramp comprises a portion connected to said internal lateral face or at a short distance from this face, said truncated or chamfered part extends over a circumference about said axis of pivoting, representing an angle of between 30 and 150°, and preferably between 90 and 120°, the adapter is configured in order to be fastened selectively to a terminal piece of a first arm and to a terminal piece of a second arm, which is different from that of the first arm, said adapter comprising at one end a head defining at least a first bearing surface of a terminal piece part and/or at least a part of an engagement hole of a terminal piece part, said adapter also comprising at least one locking push button configured in order to interact with the terminal piece of said first and/or second arm, the adapter is configured in order to be selectively fastened to a first connection member configured in order to be fastened to a third arm, and to a second connection member configured in order to be fastened to a fourth arm, said first and second connection members being different and being configured in order to cover said adapter at least in part, and the lateral flanks of the adapter are configured in order to be deformable about at least one longitudinal axis of the adapter.

The present invention also relates to an assembly comprising an adapter as described above and said first connection member which is configured in order to cover said adapter at least in part, wherein said first connection member is fastened directly onto said third arm, without an intermediate piece, said third arm being, for example, a rod arm.

The present invention further relates to an assembly comprising an adapter as described above and said second connection member which is configured in order to cover said adapter at least in part, wherein said second connection member is fastened to said fourth arm by means of a terminal piece of the arm, and comprises at least one hole configured in order to be aligned with said at least one through-hole and in order to receive a substantially cylindrical pin of said terminal piece, said fourth arm being, for example, of the side-lock type.

Said second connection member may comprise, on a first side, a first lateral surface configured in order to interact by bearing and sliding with said terminal piece of the fourth arm, and on a second, opposite side, a second lateral surface configured in order to interact by bearing and sliding with said terminal piece of the fourth arm.

The present invention thus relates to an assembly comprising an adapter as described above and a connector secured to the wiper blade, wherein the connector extends at least in part in the housing of the adapter.

Lastly, the present invention relates to a windscreen wiper blade or arm characterised in that it comprises or carries an adapter or an assembly as described above.

Connection of the protuberances to the two was of the flank affords several advantages. The interior holes of the protuberances are deeper or longer, which may provide a functional gain in terms of guiding at the time of the aforesaid articulation. Furthermore, the flanks are stiffened by the protuberances which are more robust once mounted. Mounting is thus firmer at the time of assembly. The protuberances may, furthermore, be obtained directly by moulding, when the adapter is manufactured.

DESCRIPTION OF FIGURES

The invention will be better understood and further details, features and advantages of the invention will become apparent from reading the following description given by way of non-limiting example and with reference to the appended drawings, in which:

FIGS. 3 and 4 are schematic perspective views of a connector of the windscreen wiper blade of FIG. 2, FIGS. 5 and 6 are schematic perspective views of the adapter of FIG. 2.

DETAILED DESCRIPTION

It should be noted that the figures explain the invention in detail for implementing the invention, it being of course possible for said figures to serve to better define the invention if necessary.

In the following description, the terms 'longitudinal' or 'lateral' refer to the orientation of the windscreen wiper blade or of the driving arm according to the invention. The longitudinal direction corresponds to the main axis of the blade or arm along which it extends, while the lateral orientations correspond to concurrent straight lines, that is to say straight lines which cross the longitudinal direction, notably perpendicular to the longitudinal axis of the blade or arm in the plane in which it rotates. For longitudinal directions, the terms 'exterior' (or 'rear') or 'interior' (or 'front') are to be viewed from the point at which the blade is fastened to the arm, the term 'interior' corresponding to the part where the arm and a half-blade extend, or from the point at which the arm is fastened to the vehicle. Finally, the directions referenced as 'upper' or 'lower' correspond to orientations perpendicular to the plane of rotation of the windscreen wiper blade, the denomination 'lower' containing the plane of the windscreen.

Figure 1:
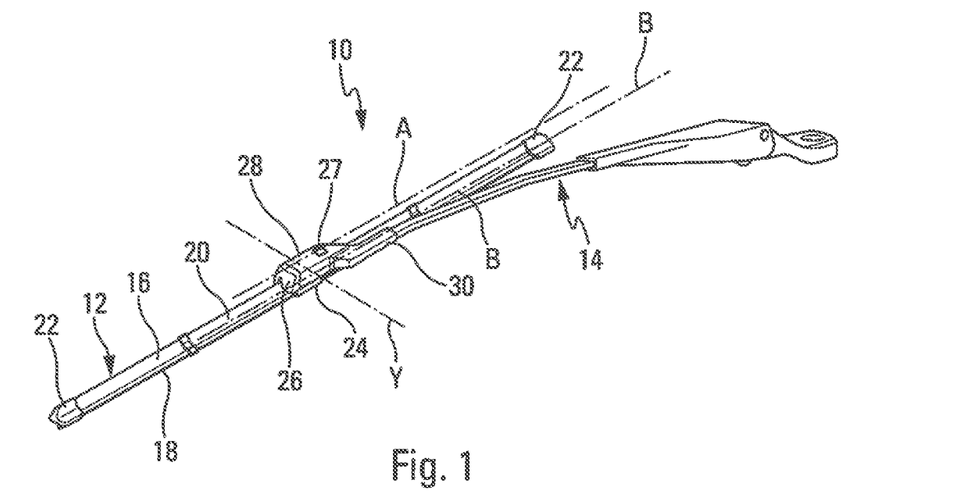
FIG. 1 is a schematic perspective view of a windscreen wiper, this windscreen wiper comprising a windscreen wiper blade and an arm for driving the blade, which are connected to one another by a connection system.

FIG. 1 illustrates a windscreen wiper 10 having notably a blade 12 and a driving arm 14 for driving the blade 12.

The blade 12 is preferably of the flat-blade type and comprises a longitudinal body 16, a squeegee blade 18, generally made of rubber, and at least one vertebra (not visible) which stiffens the squeegee blade and encourages it to press against a vehicle windscreen.

The body 16 of the blade 12 may comprise an upper aerodynamic deflector 20 intended to improve the operation of the wiping system, the purpose of this deflector being to improve the pressing of the blade against the windscreen and therefore the aerodynamic performance of the windscreen wiper.

The blade 12 may further comprise end fittings 22 or clips for attaching the squeegee blade 18 and the vertebra to the body 16, these fittings 22 being situated at each of the longitudinal ends of the body 16.

The blade 12 comprises, substantially at its middle, an intermediate connector 24. An adapter 26 secured to the arm 14 is mounted on the connector 24 so as to maintain a degree of freedom to pivot about an articulation axis Y which is a transverse axis substantially perpendicular to the longitudinal axis of the blade 12. This degree of freedom allows the blade 12 to pivot vis-à-vis the arm 14 and thus allows the blade to follow the curvature of the windscreen as it moves. The adapter 26 can be detached from the arm 14 by pressing an actuation button, in this case a push button 27, carried by the adapter.

The arm 14 is intended to be driven by a motor to follow an angular back-and-forth movement that allows water and possibly other undesirable elements with which the windscreen is covered to be evacuated. The adapter 26 provides the connection of the blade 12 to the arm 14 and, in particular, to a head or terminal piece 28 of the arm which may be formed as one piece with the arm or attached and fastened thereto.

In the example shown, the terminal piece 28 of the arm forms a yoke having a transverse section substantially in the form of a U.

The terminal piece 28 has an elongate shape, the axis of elongation A of which is generally substantially parallel to the axis of elongation or longitudinal axis of the blade 12. The terminal piece 28 comprises a part 30 for connecting to the rest of the arm 14, for example by crimping. This part 30 has an elongate overall shape and extends along an axis B substantially parallel to the axis A and spaced apart from this axis, as can be seen in FIG. 1. The part 30 is connected to a rear or interior end of the rest of the terminal piece 28, The adapter 26 according to the invention is of the 'universal' type and is designed to be mounted, without distinction, on the terminal pieces 28 of different arms, even on arms not equipped with terminal pieces, as will be described below in greater detail with reference to FIGS. 12 to 18.

FIGS. 2 to 7 show an embodiment of the adapter 26 according to the invention and also of the connector 24 designed to interact with this adapter, the adapter and the connector forming an assembly for connecting the blade 12 to the arm 14, or to one arm 14 amongst a plurality of types of arm.

Figures 3, 4, 5:
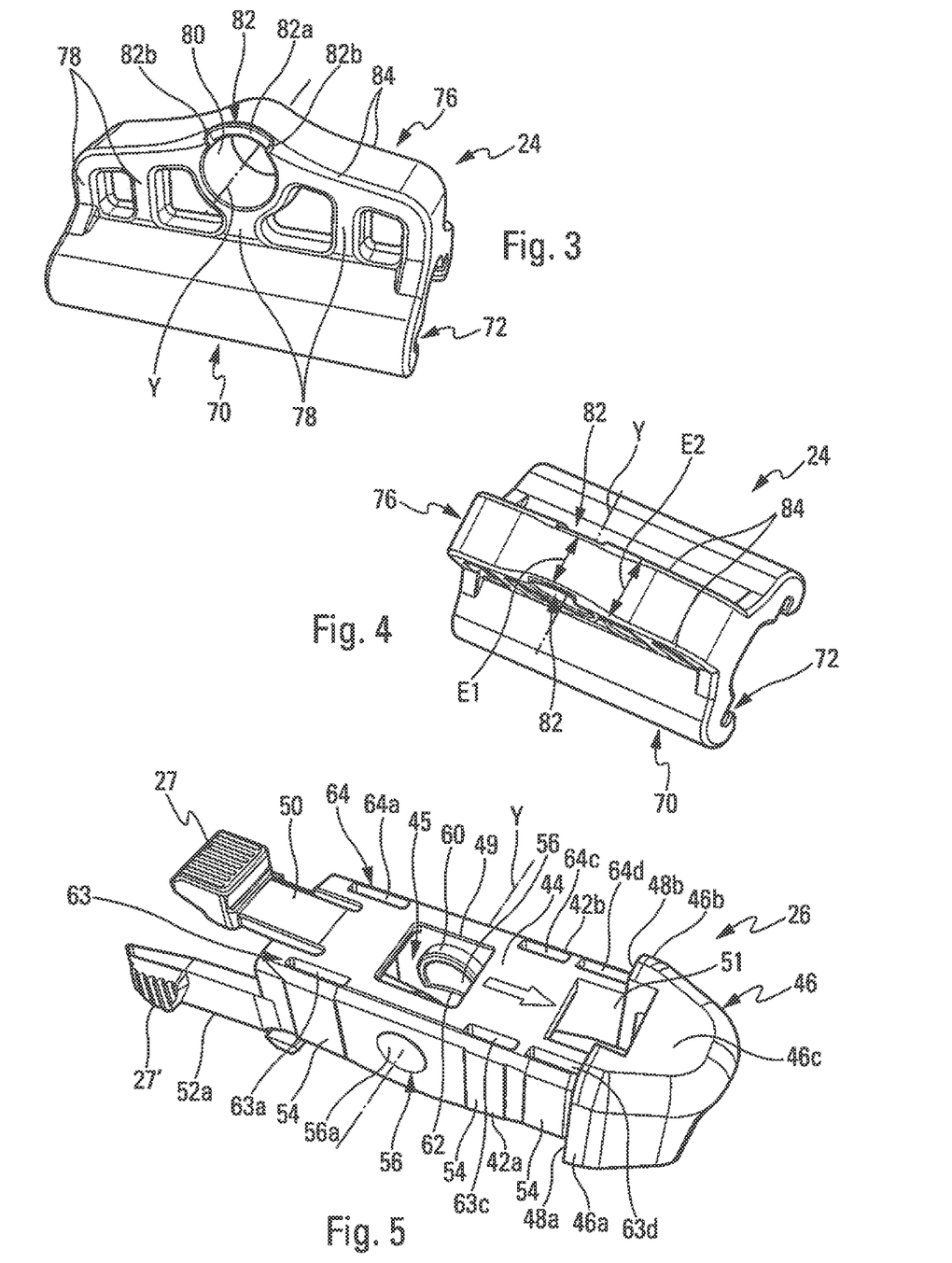
Figure 6:
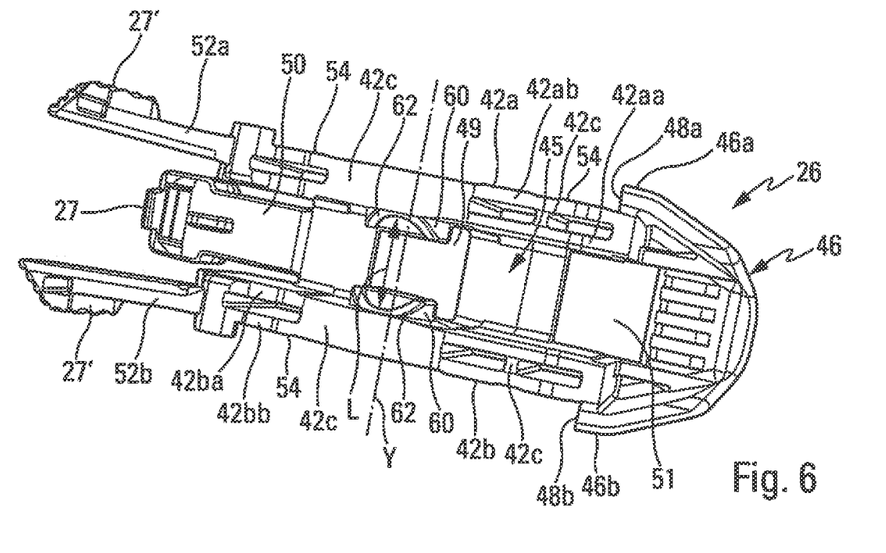

The adapter 24 has an elongate overall form along the axis A. It comprises a body having two lateral flanks 42a, 42b which are substantially parallel to one another and to the longitudinal axis A, and at a distance from one another. These flanks 42a, 42b are connected together at their upper ends by an upper transverse wall 44 substantially perpendicular to the flanks 42a, 42b. The flanks 42a, 42b, 44 here have an elongate shape in the longitudinal direction.

Figure 7:
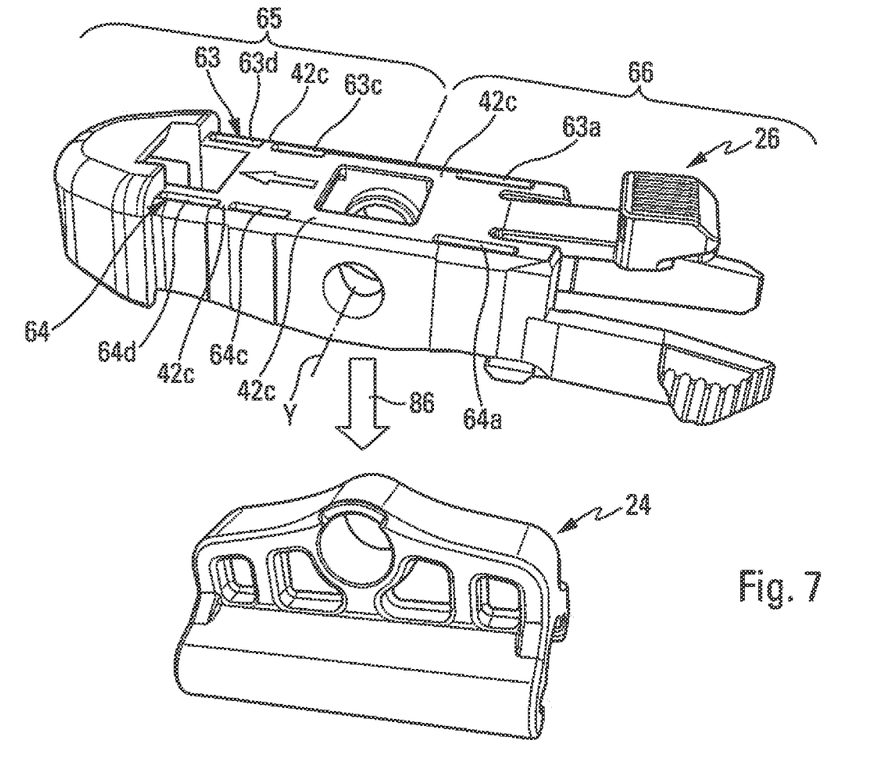
FIG. 7 is a schematic perspective view of the adapter and of the connector of FIGS. 3 to 6 and illustrates a mounting step of the adapter on the connector.

The flanks 42a, 42b, 44 of the adapter 26 between them define a longitudinal space, otherwise called a housing, 45, in which a part of the connector 24 is designed to be mounted. The flanks 42a, 42b are, here, of the double-wall type and each comprise two was 42aa, 42ab, 42ba, 42bb, an internal wall and an external wait respectively, which are parallel to and at a transverse distance from one another. The was are connected together by transverse ribs 42c which are, for example, rectilinear (FIGS. 5-7).

At least one cavity 63, 64 is formed between each pair of wads 42aa, 42ab and 42ba, 42bb. Advantageously, a plurality of cavities 63a, 63b, 63c, 63d, 64a, 64b, 64c, 64d may be formed between the walls and delimited by at least one rib 42c, in the example illustrated 5, 6 and 7, the adapter comprises three cavities 63a, 63c, 63d, 64a, 64c, 64d per lateral flank 42a, 42b.

The body of the adapter 26 is connected, at a first of its longitudinal ends, to a fairing or cowling, also called a cap or head 46. This head 46 has a lateral dimension greater than that of the body of the adapter and a height that is likewise greater than that of the body. The lateral flanks 42a, 42b of the body of the adapter are thus set back or offset relative to external lateral faces 46a, 46b of the head, and its upper wall 44 is set back or offset relative to an external upper face 46c of the head.

The lateral faces 46a, 46b of the head 46 are connected to the lateral flanks 42a, 42b of the body by lateral rear faces 48a, respectively, which extend substantially perpendicularly to the longitudinal axis A. The upper face 46c of the head 46 is connected to the upper wall 44 of the body by another upper rear face 48b that also extends substantially perpendicularly to the longitudinal axis A.

The rear faces 48a, 48b of the head 46 form bearing faces of the exterior or front end of the terminal piece 28. More precisely, in the mounted position of the adapter in the terminal piece 28, the front free edges of the lateral legs of the terminal piece are designed to come to bear on the faces 48a and the front free edge of the transverse wall of the terminal piece is designed to come to bear on the face 48b.

The upper wall 44 of the body of the adapter 26 comprises, substantially at its middle, a window 49. The upper wall 44 comprises, at its longitudinal end opposite the head 46, longitudinal slots that are parallel to one another and to the longitudinal axis A and spaced apart from one another in such a manner as to define between them at least one portion of a longitudinal tongue 50.

The tongue 50 extends longitudinally on the side opposite the head 46, in the continuation of the upper wall 44. It is elastically deformable and is connected at its exterior or front free end to the aforementioned upper push button 27 that is provided, projecting, on the tongue 50. In the free state, without constraint, each tongue 50 is such that the push button 27 is located above a plane passing via the upper wall 44. Elastic deformations of the tongues occur, here, in a substantially vertical median longitudinal plane, i.e. substantially perpendicular to the upper wall 44. The adapter 26 is thus equipped with an upper push button 27.

When the adapter 26 is mounted in the terminal piece 28, the push button 27 is intended to be engaged by elastic snap-fitting in the opening 38 in order to lock the adapter vis-à-vis the terminal piece.

The adapter 26 further comprises an upper hole 51 for engagement of a tab of an arm terminal piece. Here, this hole 51 is formed in part in the head 46, at the rear end thereof, and in part in the upper wall 44, at the front end thereof, The hole 51 has a square or rectangular overall shape.

The lateral flanks 42a, 42b of the body extend towards the interior via elastically deformable longitudinal tabs 52a, 52b. Each flank 42a, 42b is connected to a tab 52a, 52b, these tabs 52a, 52b being substantially parallel and symmetrical relative to a substantially vertical median longitudinal plane, i.e. perpendicular to the upper wall 44 of the adapter. The free ends of the tabs 52a, 52b, which are located on the side opposite the head 46, each carry a projecting lateral push button 27'. Each tab 52a, 52b thus carries a push button 27". Elastic deformations of the tabs 52a, 52b occur, here, in a substantially horizontal longitudinal plane, i.e. substantially parallel to the upper wall 44. The tabs 52a, 52b may be brought closer together by elastic deformation. The push buttons 27" are formed in order to interact with notches of the terminal piece 28, as will be described in greater detail below.

The lateral flanks 42a, 42b of the body of the adapter 26 comprise, on their external faces, ribs 54 that are substantially parallel to one another and perpendicular to the longitudinal axis A and spaced apart from one another. Each rib 54 defines, via its top, a planar surface designed to interact with the terminal piece 28 of the arm, as will be likewise described in greater detail below. These ribs 54 here correspond to portions of greater thickness of the lateral flanks 42a, 42b.

The lateral flanks 42a, 42b each comprise a through-hole 56. The holes 56 in the flanks 42a, 42b are substantially coaxial and, here, define the axis Y of pivoting of the adapter 24 on the connector 24 and thus of the blade vis-à-vis the arm. The holes 56 are, here, circular in section and each comprise a substantially cylindrical internal surface 56a. The holes 56 open at their external lateral ends on the external faces of the flanks 42a, 42b, respectively, and at their internal lateral ends in the housing 45.

The internal lateral faces 85, 87 facing the lateral flanks 42a, 42b comprise protuberances 60. Each lateral flank 42a, 42b comprises a protuberance 60, the protuberances here being opposite one another and extending substantially towards one another. They extend in the housing 45. The protuberances 60 are symmetrical relative to a median longitudinal plane of the adapter, perpendicular to the upper wall 44. Each protuberance 60 also has a plane of symmetry passing via the axis Y of pivoting and perpendicular to the longitudinal axis A.

Each protuberance 60 is holed and comprises a through-hole. This hole is, here, formed by one of the aforesaid holes 56. Each protuberance 60 is thus located on the internal face 85 or 87 of the lateral flank 42a or 42b so as to be traversed by the hole 56 of this flank.

Each protuberance 60 has a cylindrical and, here, tubular general shape on account of the hole 56 traversing it. The axis of each hole 56, which is merged with the axis Y of pivoting, is likewise merged with the axis of the corresponding protuberance 60, such that the hole 56 is centred vis-à-vis the protuberance. Each protuberance 60 thus forms an annular bead of material around the hole 56, having, substantially, a radial thickness relative to the axis Y of pivoting that is substantially constant. Each protuberance 60 has an axial dimension along the axis Y of pivoting that represents approximately 10 to 20% of the axial dimension or width of the housing along the axis Y of pivoting. Each protuberance 60 has an external diameter that represents approximately 60 to 80% of the height of the corresponding lateral flank 42a, 42b, measured in a direction substantially vertical and perpendicular to the upper wall 44.

Each protuberance 60 is connected to the two walls 42aa, 42ab, 42ba, 42bb of the corresponding flank 42a, 42b. As may be seen in FIG. 6, each protuberance 60 is directly connected to the internal wall 42aa, 42ba of the flank 42a, 42b and extends from the internal face of this internal wall. Each protuberance 60 is advantageously connected to the external wall 42ab, 42bb of the flank 42a, 42b by an inter-wall rib 42c.

As may be seen in FIGS. 5 and 6, each protuberance 60 comprises a truncated or chamfered part, which, here, is a lower part. Each truncated or chamfered part defines a ramp 62 extending in an inclined plane relative to the lateral flanks 42a, 42b. Each ramp 62 defines a sliding surface intended to interact with the connector 24. The ramps 62 of the protuberances 60 are inclined such that they diverge from one another from the top towards the bottom. Their lower ends, located on the side opposite the upper wall 44, are spaced apart from one another by a distance L along the axis Y of pivoting (FIG. 6). The lower end of each ramp 60 extends at a short distance, along the axis Y of pivoting, from the internal face 85, 87 of the corresponding lateral flank 42a, 42b and may be directly connected to this internal face. In this latter case, the distance L is substantially equal to the distance between the internal faces 85 and 87 of the flanks 42a, 42b or to the width of the housing 45. Each ramp 62 extends over a circumference about the axis Y of pivoting, representing an angle of between 30 and 150°, and preferably between 90 and 120°.

The adapter 26 described above is advantageously a unit, i.e. constituted by one and the same synthetic material. It may thus be manufactured in the course of a single moulding operation, particularly by means of injection-moulding.

The adapter 26 is fastened to the connector 24 by virtue of the protuberances 60 that form means for fastening the adapter to the connector and which can furthermore form means for pivoting or rotation of the adapter vis-à-vis the connector. The fastening means are of the elastic snap-fit type, the protuberances 60 of the adapter 26 being designed to interact by elastic snap-fitting with complementary means of the connector 24.

The connector 24, which can be better seen in FIGS. 3 and 4, is arranged so as to be rendered secure, for example by crimping, on the blade 12. The connector 24 provides a 'complete' mechanical connection with the blade 12, in the sense that there is no degree of freedom. The connector 24 may also provide a function of transporting and distributing a liquid for washing the vehicle windscreen.

The connector 24 comprises a base 70 extending longitudinally and transversely. This base 70 comprises a zone 72 of securing to the blade 12 and, more particularly, to at least one vertebra 74 of this blade. This zone 72 of securing has the form, for example, of a slit made in the base 70, this slit being bordered by two hooks capable of engaging on the blade.

In the example shown, the blade 12 comprises two parallel and coplanar vertebrae 74 spaced apart from one another in order to define a space for housing the squeegee blade 18 or the body 16 of the blade. Each vertebra comprises a longitudinal edge opposite the squeegee blade 18, which is received in the slit of the connector 24.

The base 70 is surmounted by a flank 76, for example, made as one with the base. This flank 76 has a transverse dimension that is less than that of the base and a longitudinal dimension substantially equal to that of the base. The flank 76 is, for example, centred on the base 70, in accordance with the axis Y of pivoting. The flank 4 may have a plurality of ribs 78 that mechanically reinforce the flank.

The connector 24 and the adapter 26 are connected mechanically by a pivot connection. As far as the connector 24 is concerned, this pivot connection is implemented by a cavity 80 made in the flank 76 of the connector. This cavity 80 extends in accordance with the axis Y and has a circular section. It traverses the flank 76. In other words, the cavity 80 has a central axis centred on the axis Y of pivoting.

The connector 24 described above is advantageously a unit, i.e. constituted by one and the same synthetic material. This connector may thus be manufactured in the course of a single moulding operation, particularly by means of injection-moulding, The adapter 26 is mounted on the connector 24 by elastic snap-fitting of its protuberances 60 into the cavity 80 of the connector. The ramps 62 of the protuberances 60 of the adapter 26 interact with the connector in order to facilitate this mounting. The connector, meanwhile, also comprises means facilitating an insertion of the protuberances 60 of the adapter 26 in its cavity 10.

Here, these means are provided on the flank 76 of the connector 24, In the present case, these means are grooves 82 made in the lateral faces delimiting the flank 76 and in line with which the cavity 80 terminates. It will be understood, here, that each groove 82 and the cavity 80 intersect one another, the groove 82 thus extending from a ridge 84 of the flank 76 as far as the hole forming the cavity 80. In line with each groove 82, the flank 76 has a thickness E1 that is less than a thickness E2 of a portion of the flank 76 bordering said groove 82. These thicknesses E1, E2 are measured in accordance with a direction parallel to the axis Y of pivoting. Thus formed, this groove 82 is delimited by a bottom 82a and by two portions 82b that connect the bottom 82a to the corresponding lateral face of the flank.

The bottoms 82a of the grooves 82 are parallel or inclined relative to one another. In this latter case, they are inclined such that their upper ends, located on the side opposite the cavity 80, are closer than are their lower ends.

As shown in FIG. 7, the assembly of the adapter 26 on the connector 24 takes place solely by means of a vertical translation illustrated by the arrow referenced 86 in accordance with an axis perpendicular to the upper wall 44 of the adapter. In the course of this translation, the protuberances 60 of the adapter 26 engage in the grooves 82 of the connector and interact with their portions 82b in order to centre the adapter on the connector. The ramps 62 have guide surfaces that interact by sliding with the bottoms 82a of the grooves. To that end, the aforesaid distance L is preferably greater than the thickness E1. Furthermore, the distance between protuberances 60, measured along the axis Y of pivoting, is less than the width of the cavity 80 and also the thickness E2.

Figure 2:
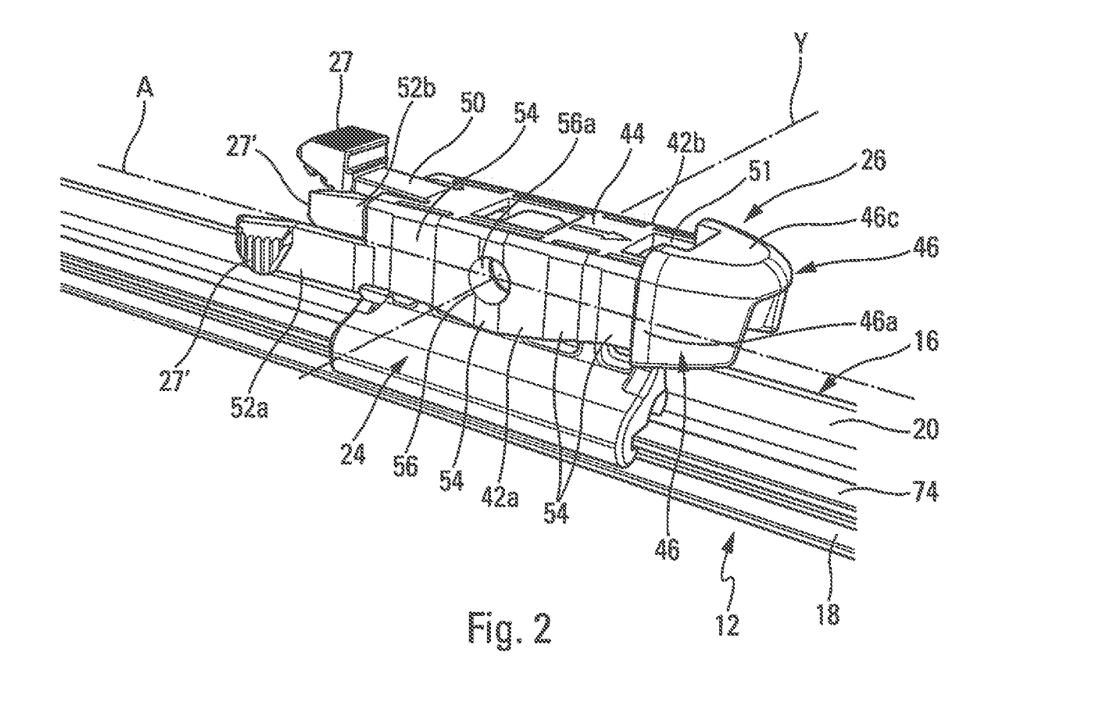
FIG. 2 is a schematic perspective view of a windscreen wiper blade equipped with an adapter according to the invention.

Upon insertion of the protuberances 60 into the grooves 82, the ramps 62 bear on the bottoms of the grooves and the downward translation of the adapter is continued such that the lateral flanks 42a, 42b of the adapter are obliged to deform, with one separating from the other on account of the sliding of the ramps over the bottoms of the grooves. This operation is continued until the protuberances 60 engage by elastic snap-fitting or return in the cavity 80 of the connector. The adapter is then fastened to the connector and may, furthermore, pivot on same about the axis Y of pivoting, by means of interaction of its protuberances with the internal cylindrical surface 80a of the cavity. The cavity 80 has an internal diameter substantially equal to or slightly greater than that of the protuberances 80 in order to allow the adapter and the connector to rotate with respect to one another. The mounting shown in FIG. 2 is thus obtained.

As mentioned previously, the adapter 26 is of the universal type since it is capable of being fastened to a plurality of types of arms, be these arms with a terminal piece or arms without a terminal piece.

Figure 8:
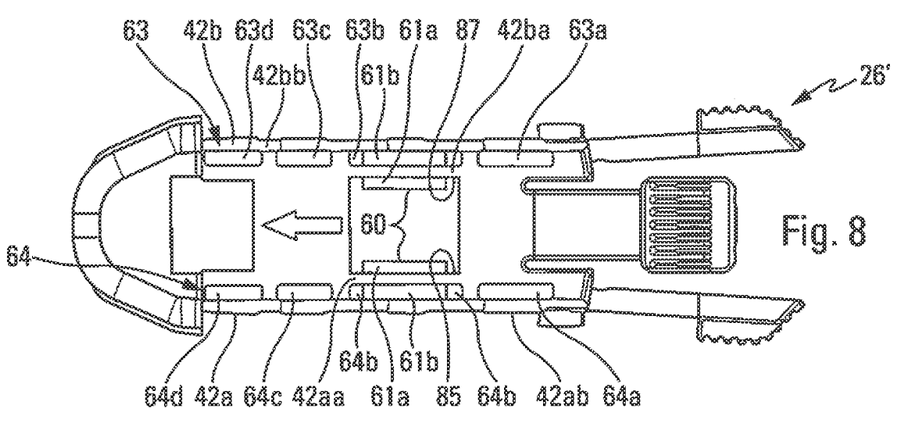
FIGS. 8 to 10 are schematic perspective views of a variant embodiment of the adapter.
Figure 9:
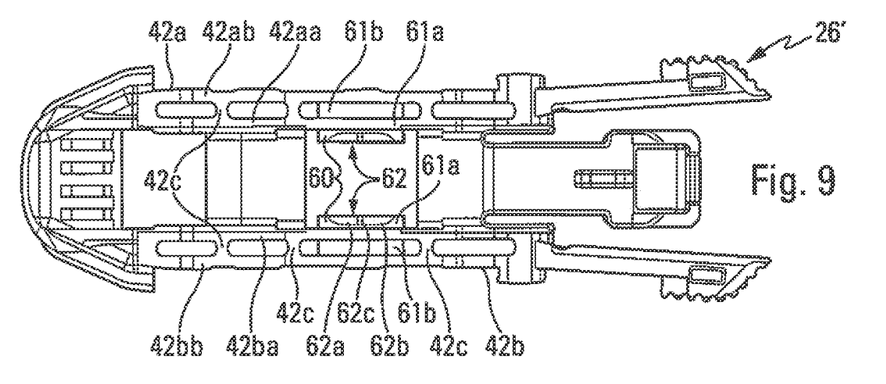
Figure 10:
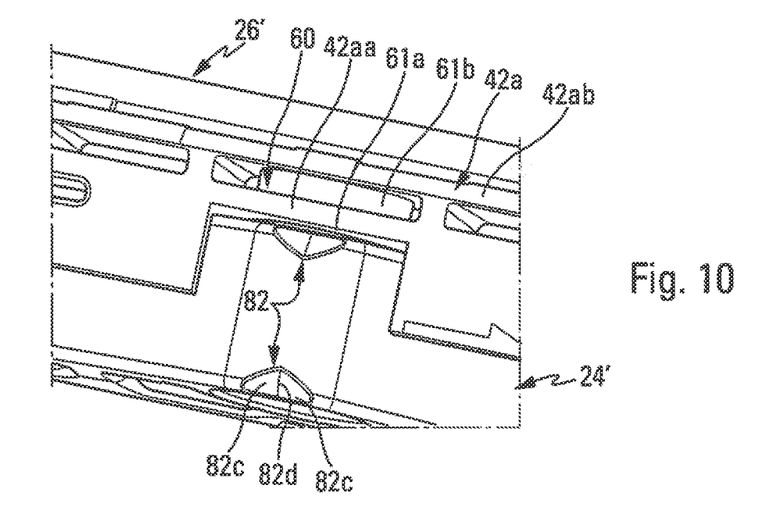
Figure 11:
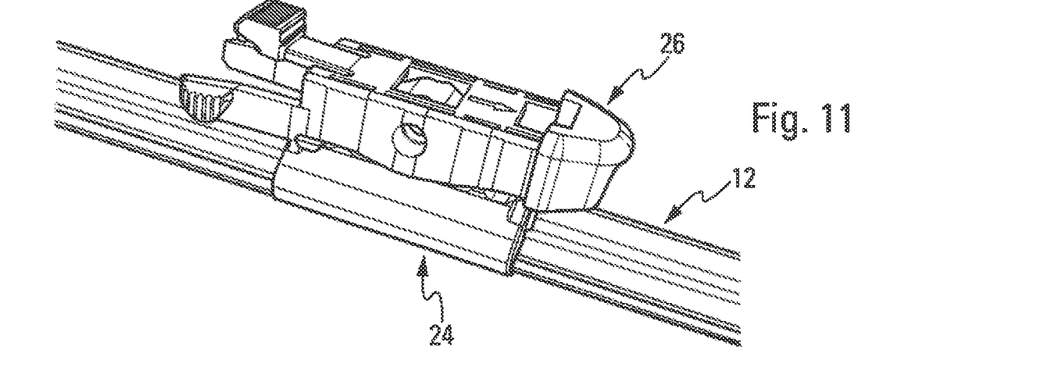
FIGS. 11 to 18 are schematic perspective views of the windscreen wiper blade of FIG. 2 and of different driving arms connected to the blade by virtue of the adapter according to the invention.

Reference is now made to FIGS. 8 to 10, which show a variant embodiment of the adapter 26' comprising all the aforesaid features of the adapter 26 in so far as they do not conflict with the following.

Each protuberance 60 is connected to the two wails 42aa, 42ab, 42ba, 42bb of the corresponding flank 42a, 42b and comprises a first part 61a connected to the internal wall 42aa, 42ba of the flank 42a, 42b and extending from the internal face 85, 87 of this flank, and a second part 61b that extends between the was 42aa, 42ab or 42ba, 42bb that constitute one and the same flank. As may be seen in the drawings, unlike the preceding embodiment the parts 61a, 61b have, here, in cross section, a form that is similar or even identical, this being an annular form, and the internal and/or external diameter may be identical.

The second part 61b of the protuberance 60 extends between the walls from which the first part 61a of the protuberance originates, forming a bearing. Compared with the first embodiment of the adapter, the second part 61b thus extends in a fourth cavity 63b, 64b. The adapter thus comprises eight cavities distributed, in two pairs of four, in each flank 42a, 42b of the adapter.

In the example shown, the ramp 62 of each protuberance 60 has, in cross section, a form that is substantially an inverted V. It comprises two adjacent sliding surfaces 62a, 62b that are inclined relative to one another. The two surfaces 62a, 62b are, here, inclined relative to one another by an angle of between 190 and 330°, and preferably between 200 and 240°.

The sliding surfaces 62a, 62b each have a general wing or D form. The surfaces are connected together by a substantially rectilinear cord 62c. This cord 62c has, here, in cross section, a convex curved form.

As may be seen, in particular, in FIG. 8, the ramp 62 is formed by a chamfer located on an external annular ridge of the protuberance 60, more particularly at the free end of the first part 61a of the protuberance 60.

The ramps 62 and their surfaces 62a, 62b are symmetrical relative to a first median longitudinal plane perpendicular to the upper wall of the adapter and also relative to a second plane perpendicular to the first plane and to the upper wall of the adapter and passing via the axis Y of pivoting.

Each notch 82 of the connector 24' designed to interact with the adapter 26 has, in cross section, a form that is substantially an upright V. It comprises two adjacent sliding surfaces 82c, 82c that are inclined relative to one another, in this case by an angle of between 30 and 170°, and preferably between 120 and 160°.

The surfaces 82c, 82c are connected together by as rectilinear cord 82d that, here, in cross section, has a concave curved form. The surfaces each have a general delta-wing form in the example shown.

The notches 82 of the connector 24' are symmetrical relative to a first median plane perpendicular to the axis Y of pivoting. A second plane perpendicular to said first plane passes substantially via the axis Y of pivoting and in the middle of the notches.

The assembly of the adapter 26' on the connector 24° takes place solely by means of a vertical translation in accordance with an axis perpendicular to the upper wall of the adapter. In the course of this translation, the protuberances 60 of the adapter 26' engage in the notches 82 of the connector and their surfaces 62a, 62b interact with the surfaces 82a, 82b in order to centre and to guide the adapter on the connector. Upon insertion of the protuberances 60 into the notches 82, the ramps 62 bear on the surfaces of the notches and the downward translation of the adapter is continued such that the lateral flanks 42a, 42b of the adapter are obliged to deform, with one separating from the other on account of the sliding of the ramps over the surfaces of the notches. This operation is continued until the protuberances 60 engage by elastic snap-fitting or return in the hole of the connector. The adapter is then fastened to the connector and may, furthermore, pivot on same about the axis Y of pivoting, by means of interaction of its protuberances with the internal cylindrical surfaces of the hole of the connector.

FIGS. 11 to 18 show several types of arms that can be equipped with the adapter 26, 26' according to the invention.

Figure 12:
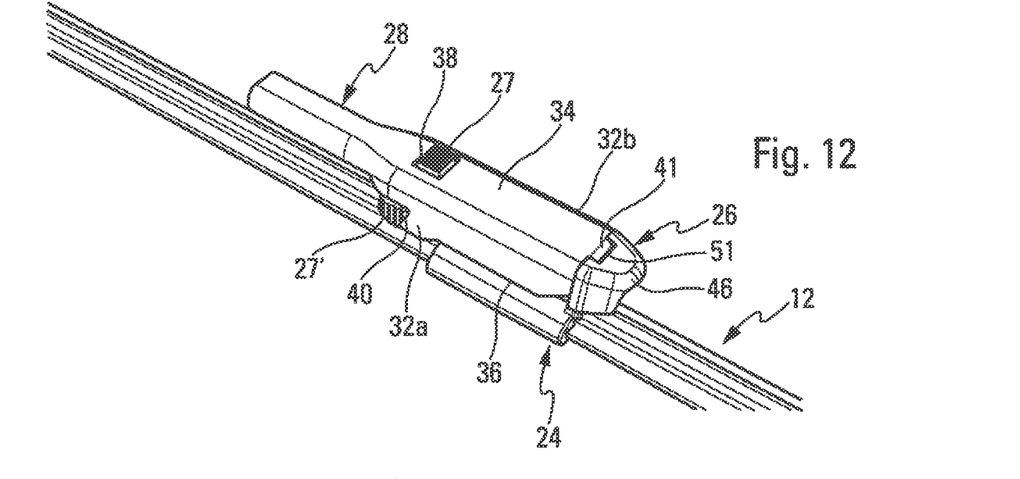
Figure 13:
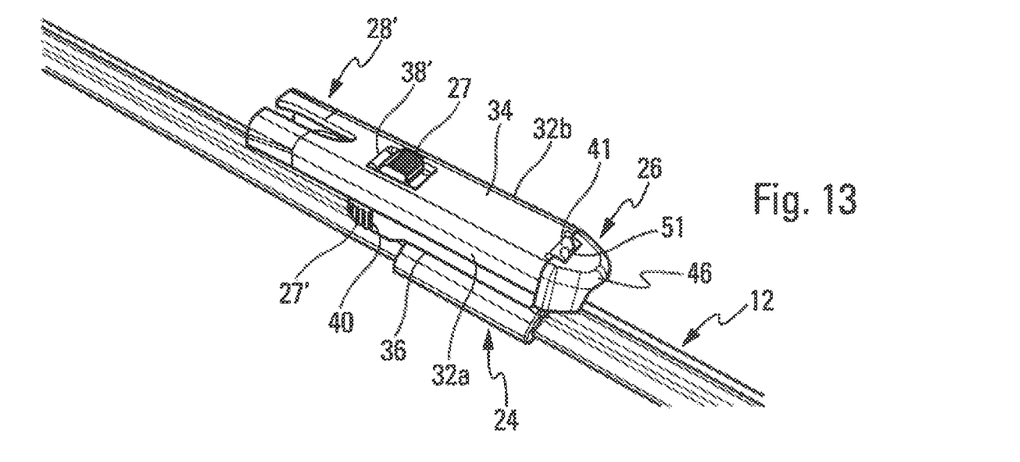

Reference is made, first, to FIGS. 12 and 13, which show, respectively, two terminal pieces 28, 28' of different driving arms.

Each terminal piece 28, 28' comprises two lateral legs 32a, 32b, the upper longitudinal edges of which are connected together by an upper transverse wall 34. Between them, the legs 32a, 32b and the wall 34 delimit a space for accommodating the adapter 26. The legs 32a, 32b may comprise, at the level of their lower longitudinal edges, means 36, such as hooks, for retention of the adapter 26 in the aforesaid space.

The upper wall 34 comprises a through-aperture 38, 38' designed to receive the upper push button 27. In the mounted position, the push button 27 is accommodated in this aperture 38 and is able to pass through the latter so as to project from the upper face of the wall 34. Mounting of the push button 27 in the aperture 38 takes place by means of simple engagement or fitting, preferably by elastic snap-fitting.

The lateral was 32a, 32b may each comprise a notch 40 of a shape complementing a lateral push button 27'. In the mounted position, the lateral push buttons 27' are accommodated in these notches 40 and are able to traverse them so as to project from the external faces of the walls 32a, 32b. Mounting of the push buttons 27" in the notches 40 takes place by means of simple engagement or fitting, preferably by elastic snap-fitting.

The terminal pieces 28, 28' are different. They have the same form overall but are different from one another in particular in terms of the dimensions and in terms of the shape and the size of their apertures 38, 38' or notches 40.

The upper wags 34 of the terminal pieces 28, 28' continue towards the exterior in order each to form a tab 41 with a longitudinal section substantially in the form of an S, which is configured in order to be engaged in the hole 51 of the adapter 26.

The terminal pieces 28, 28' have substantially the same external width. Furthermore, the ribs 54 formed on the external faces of the lateral flanks of the body of the adapter 26 may be spaced apart by a transverse distance substantially equal to the internal width of the transverse piece 28, 28', such that the terminal piece is wedged in the transverse direction by means of interaction of its legs with the lateral flanks of the body of the adapter.

A description will now be given of the assembly of the adapter 26 according to the invention on each of the terminal pieces 28, 28', The adapter 26 is engaged in the terminal piece 28, 28' by first inclining the axis of the adapter vis-à-vis axis A of the terminal piece 28 then engaging the tab 41 of the terminal piece in the hole 51 of the adapter. Upon this engagement, the legs of the terminal piece start by sliding on the ribs 54 of the adapter. Furthermore, the front end edge of the upper wall of the terminal piece comes to bear on the face 48b of the head 46 of the adapter. The rear end of the adapter is then brought closer to the terminal piece until the lateral push buttons 27' engage by elastic snap-fitting in the notches 40 of the terminal piece 28, 28'. The front end edges of the lateral legs 32a, 32b of the terminal piece come to bear on the faces 48a of the head 46 of the adapter. The axes of the adapter and of the terminal piece 28 are thus substantially parallel.

Figure 14:
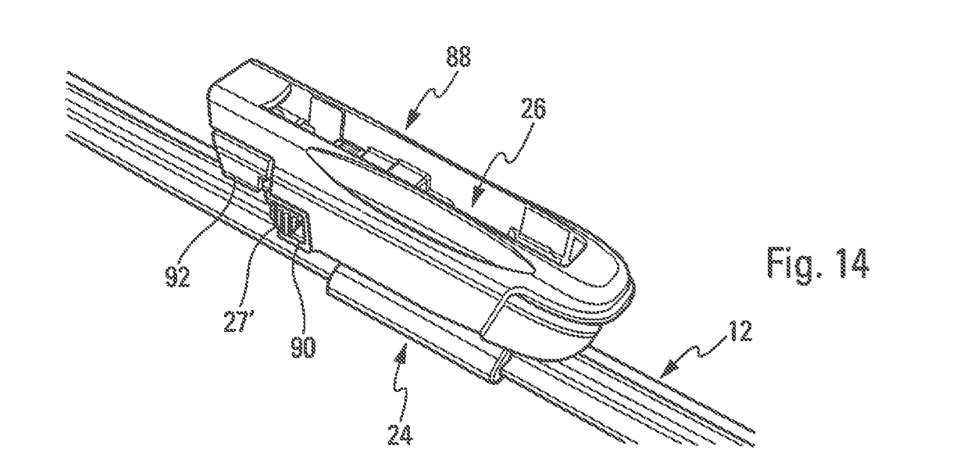
Figure 15:
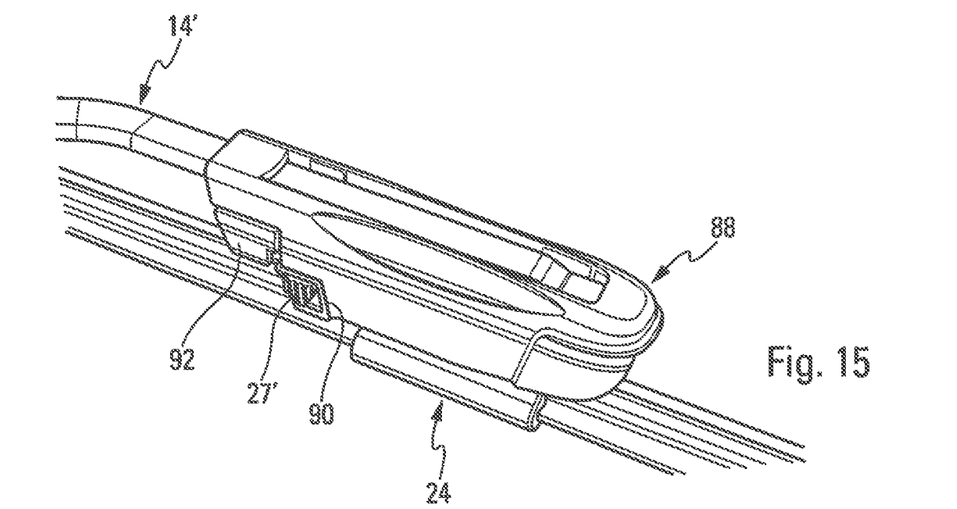

Reference is now made to FIGS. 14 and 15, in which the adapter 26 is connected to an arm 14 of the rod arm type, i.e. an arm without a supplementary terminal piece, by means of a first connection member 88.

This connection member 88 is mounted on the adapter 26 and covers it fully in the example shown. It has a longitudinal form and comprises an internal housing in which the adapter is mounted and retained. At its rear end, it comprises lateral notches designed to receive the push buttons 27', respectively, by means of elastic snap fitting, The rod arm 14' comprises an end engaged in the connection member 88 over substantially the entire length thereof, from the rear longitudinal end of the member 88. The rod arm 14' is secured to the member 88 by appropriate means and may be detached from the member by actuation of push buttons 92 carried by the member and designed to interact with the and of the rod arm 14'.

Figure 16:
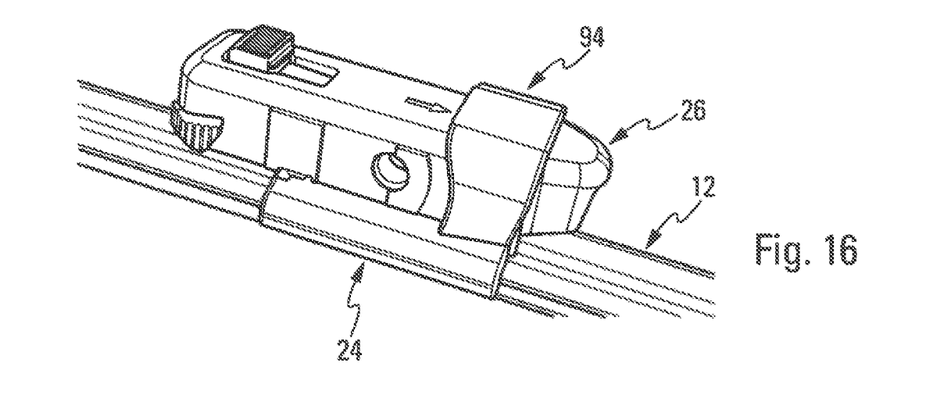
Figure 17:
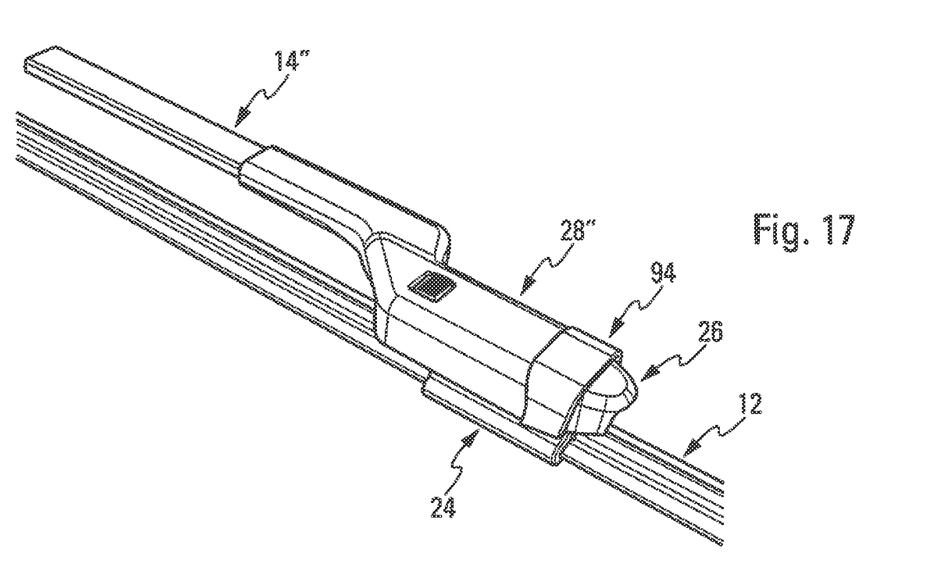
Figure 18:
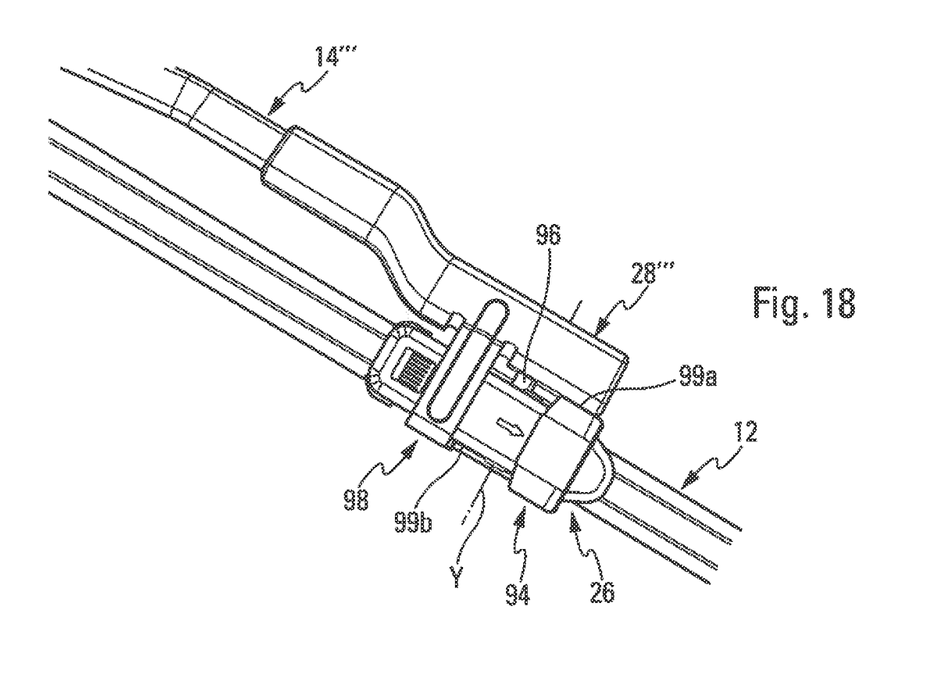

FIG. 16 shows a second connection member 94 that may be used to connect the adapter 26 to two other types of arms, shown, respectively, in FIGS. 17 and 18.

The connection member 94 is similar to the adapter and is designed to be mounted on the adapter in order to cover the latter at least in part. It is, in particular, used in order to be able to equip an arm 14" provided with a broad terminal piece 28" with the adapter 26. The terminal piece 28" of the arm 14" in FIG. 17 differs from those of FIGS. 12 and 13 particularly in that it is broader, in particular 22 mm as compared with the 19 mm of the terminal piece illustrated in FIGS. 12 and 13. The connection member 94 is configured in order to take up the clearances between the adapter 26 and the terminal piece 28" and in order to match the forms of these latter, being sandwiched between them. The terminal piece 28" is similar to those of FIGS. 12 and 13.

The arm 14" of FIG. 18 is an arm with lateral locking (a side-lock arm), the terminal piece 28" of which comprises, first, a cylindrical rod 96 extending transversely on one side of the terminal piece and also an L-shaped latch 98 extending transversely on the same side as the rod 96 and parallel to and at a distance from the latter.

The rod 96 is designed to traverse lateral holes of the member 94 that are aligned on the axis Y of pivoting and thus aligned with the holes 56 of the adapter 26 and the cavity 80 of the connector. The rod 96 is engaged in these holes and cavities until its transverse piece 28''' bears on an external lateral face 99a of the member 94. The transverse piece 28''' is able to interact by sliding with the external lateral face 99a upon pivoting of the blade vis-à-vis the arm 14'''.

The L-latch 98 comprises a hook at its free end that is designed to interact by sliding with an opposite lateral face 99b of the member 94 upon pivoting of the blade vis-à-vis the arm 14''', and prevents accidental detachment of the blade from the arm during operation.

The 'universal' adapter 26 according to the invention may thus be combined with a plurality of types of driving arm.

The invention claimed is:

1. An adapter for connecting a windscreen wiper blade to a driving arm, the adapter comprising:
   a 'U'-section formed by a base and two flanks delimiting a housing in which:
      at least one of the two flanks is formed by at least two walls separated from one another by at least one cavity,
      at least two protuberances each originating from a flank and extending substantially towards one another in the housing,
      wherein at least one of the at least two protuberances is connected to both of the two walls and extends at least in part inside said housing, and
      wherein at least one of the at least two protuberances comprises at least one through-hole, and
   at least one lateral push button configured to detach the adapter from the driving arm,
   wherein each of the two flanks comprise a hole, wherein one of the holes of the two flanks form the through-hole of the at least one protuberance, such that the at least one protuberance is located on an internal face of the corresponding flank so as to be traversed by the hole of the corresponding flank,
   wherein each of the at least two protuberances, holed and comprising the through-hole, comprises a ramp, wherein the ramps are spaced apart by a distance equal to a distance between the internal face of each of the two flanks.

2. The adapter according to claim 1, wherein each of the at least two protuberances is connected to one of the at least two walls delimiting the cavity.

3. The adapter according to claim 1, wherein at least one of the protuberances is configured in order to interact with a complementary means of a connector for fastening the adapter to the connector and to define at least one means of pivoting about an axis between the adapter and the connector.

4. The adapter according to claim 1, wherein the two flanks are each formed by at least two walls separated from one another by at least one cavity.

5. The adapter according to claim 1, wherein at least one of the flanks comprises a plurality of cavities separated from one another by at least one rib.

6. The adapter according to claim 5, comprising a front part separated from a rear part by an axis of pivoting passing via the protuberances, where the front part of the adapter comprises more cavities than does the rear part.

7. The adapter according to claim 1, wherein at least one of the protuberances extends in a cavity provided between the walls of the flank from which the at least one protuberance extends.

8. The adapter according to claim 1, wherein the cavity or cavities opens out on either side of the adapter.

9. The adapter according to claim 1, wherein said at least one protuberance is configured in order to be engaged by elastic snap-fitting in a complementary means of a connector.

10. The adapter according to claim 9, wherein said at least one protuberance comprises a truncated or chamfered part for facilitating its engagement by elastic snap-fitting in said complementary means of said connector.

11. The adapter according to claim 1, wherein the at least two protuberances define one and the same axis of pivoting of the adapter on a connector.

12. An assembly comprising:
   the adapter according to claim 1; and
   a connector, wherein the connector extends at least in part in the housing of the adapter.

13. A wiper blade or arm of a windscreen wiper, comprising the adapter according to claim 1.

14. An assembly comprising:
   the adapter according to claim 1; and
   a wiper arm comprising an upper wall having a through-aperture for receiving the at least one lateral push button.

15. The assembly according to claim 14, wherein, in a mounted position, the at least one lateral push button is accommodated in and passes through the through-aperture so as to project from an upper face of a transverse upper wall, and wherein the at least one lateral push button is mounted in the aperture by elastic snap-fitting.

16. The adapter according to claim 3, wherein each hole of the two flanks being substantially coaxial and defining the axis of pivoting of the adapter on the connector, wherein each hole of the two flanks comprises a substantially cylindrical internal surface.

17. The adapter according to claim 16, wherein the axis of each hole of the two flanks is merged with the axis of pivoting, which is merged with an axis of the corresponding protuberance, such that the hole of each flank is centered with respect to the protuberance.

18. The adapter of claim 1,
   wherein said at least one protuberance comprises a first part projecting from one of the walls, called the internal wall, in the housing and a second part extending between the walls of the flank,
   wherein said first and second parts have identical shapes in cross section with an external diameter and an internal diameter of the first part being identical to an external diameter and an internal diameter of the second part, respectively.

* * * * *